Nov. 22, 1949  H. B. WALDRON  2,488,696
AUTOMATIC LATHE STOP
Filed June 7, 1946  2 Sheets-Sheet 2
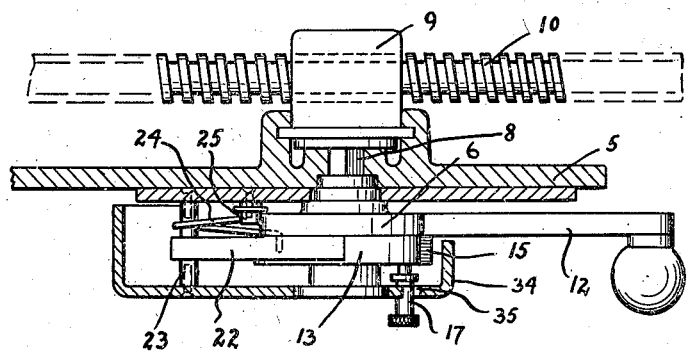
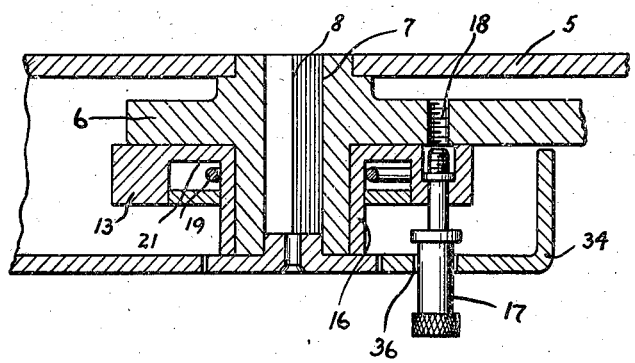
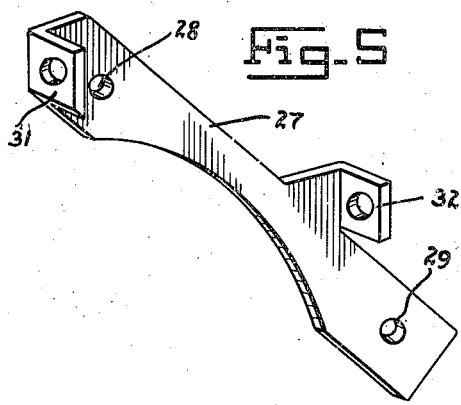
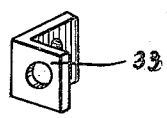
Inventor
Harvey B. Waldron
By Clarence A. O'Brien
and Harvey B. Jacobson
Attorneys Patented Nov. 22, 1949

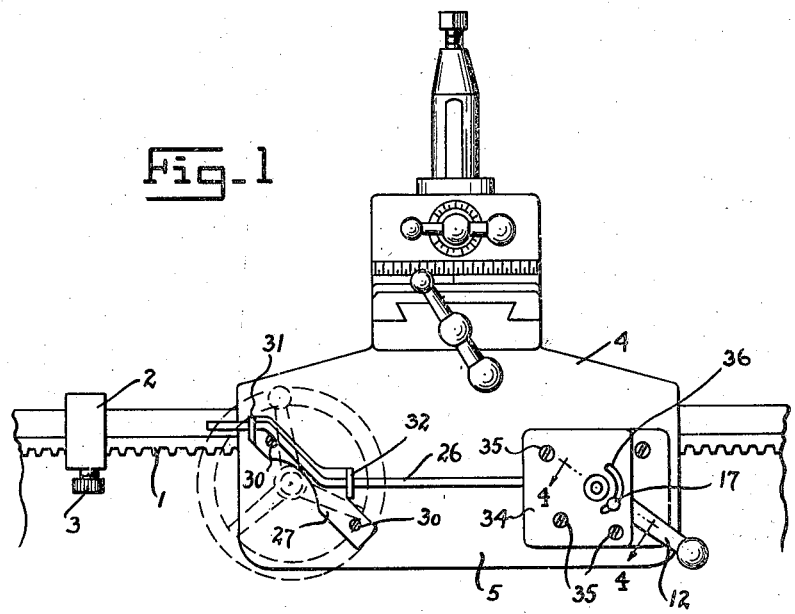
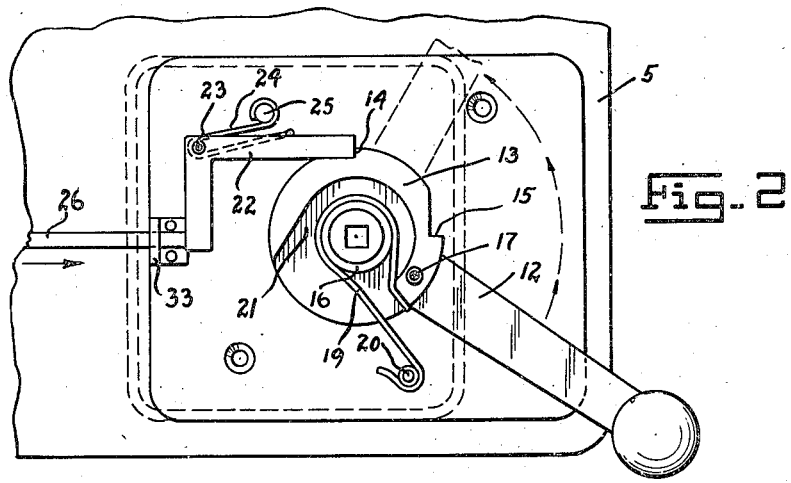
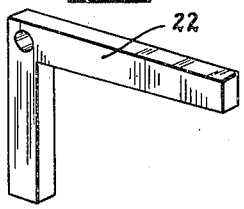

2,488,696

UNITED STATES PATENT OFFICE 2,488,696

AUTOMATIC LATHE STOP

Harvey B. Waldron, Bristol, Pa.

Application June 7, 1946, Serial No. 675,140

3 Claims. (Cl. 82—21)

This invention relates to improvements in automatic lathe stop mechanisms.

An object of the invention is to provide an improved automatic lathe stop which will automatically release the half nut on the lead screw of a lathe at a pre-set point to stop the lathe carriage at said point after each operation of the lathe carriage.

Another object of the invention is to provide an improved automatic lathe stop mechanism including a resiliently tensioned two notch ratchet and operating handle supported on the half nut operating shaft, the same being associated with a spring pressed pawl engageable by a sliding trip rod when said rod engages the stop on the lathe bed rack to instantly release the ratchet mechanism and half nut connected therewith to stop the movement of the lathe carriage at exactly the same point throughout each operation of the lathe.

Another object of the invention is to provide an improved automatic stop mechanism which will be highly efficient in operation and relatively inexpensive to manufacture and produce.

A still further object of the invention is to provide an improved automatic stop mechanism which may be applied to the carriage apron of many types of lathes to positively stop the lathe carriage at the pre-set point whenever operated.

Other objects will appear as the description proceeds.

In the accompanying drawings which form a part of this application,

Figure 1 is a front elevation of a lathe carriage and lathe bed rack showing the improved automatic stop mechanism incorporated thereon;

Figure 2 is a front elevation of the improved two notch ratchet and operating handle mechanism showing the same associated with the pivoted pawl and sliding trip rod;

Figure 3 is a transverse sectional view looking down on the carriage apron and showing the improved two notch ratchet member and handle connected with the half nut operating shaft mounted on a lathe lead screw;

Figure 4 is an enlarged transverse sectional view through the rotatable ratchet member and operating handle showing the resilient spring tensioning means therefor with locking pin being detached from the operating handle;

Figure 5 is a perspective view of the bracket supporting member used for supporting the sliding trip rod;

Figure 6 is a perspective view of the bracket member for supporting the pawl engaging end of the trip rod, and Figure 7 is a perspective view of the pivoted pawl used in conjunction with the two notch ratchet member.

Like characters of reference are used throughout the following specification and the accompanying drawings to designate corresponding parts.

In carrying out the invention, there is provided a lathe (not shown) having the usual lathe bed rack 1 upon which the stop 2 will be adjustably mounted and supported in the desired adjusted position by means of the locking set screw 3 carried thereby.

The lathe carriage 4 is supported upon the bed rack 1 in the usual manner and is provided with the carriage apron 5.

The usual screws or bolts in the front portion of the lathe apron and the usual half nut operating lever will be removed from the lathe, and the improved automatic lathe stop mechanism will be attached to the carriage apron in the manner hereinafter described.

A hub member 6 is formed with an axial passage 7 being square in cross section, and is adapted to receive the projecting square shank 8 of the half nut operating shaft which extends through the carriage apron 5 extending forwardly thereof. The half nut housing 9 is arranged to permit the lead screw to feed therethrough as the lathe carriage 4 moves backwards and forwards during the operation of the lathe.

The hub member 6 is formed with the integral handle or lever 12. A two notch ratchet member 13 is provided with the spaced peripheral notches 14 and 15, and also with the bearing collar 16 formed integrally therewith, and may be locked to the operating lever 12 by means of the unlocking screws 17 slidably supported by said ratchet member and arranged to be threaded into the threaded bore 18 in the hub member 6 when the automatic lathe mechanism is to be operated, and to be released from the bore 18, as shown in Figure 4 of the drawings for manual operation of the half nut lever in the conventional manner.

A tensioning spring 19 is secured about the threaded spacing stud 20 on the carriage apron 5, and is positioned in the annular cut out groove 21 about the collar portion 16 of the ratchet member 13 and is bent about said collar portion 16 to engage and to be secured to the edge of said ratchet member 13, for tensioning the upward movements of the handle 12 and the hub member 6 when moved upwardly to released position.

The L-shaped pawl 22 is pivoted on the threaded spacing stud 23 on the apron 5, and is resiliently tensioned by the spring 24 secured to the stud 25 and engaging said pawl 22 to normally urge the same downward to seat in the ratchet notches 14 or 15, depending upon whether the ratchet member is in set or released position. The notch 14 is provided for preventing the hub member 6 from passing beyond the neutral point for locating the locking screw when the half nut is released.

When the hub member 6 and the ratchet member 13 are coupled together by means of the screw 17, the carriage 4 may advance until the trip rod 26 is engaged by the stop 2 on the lathe bed rack 1, whereupon the opposite end of the rod 26 will engage the pivoted L-shaped pawl 22 to release the half nut mechanism to instantly stop the motion of the lathe carriage 4.

A bracket 27 will be apertured at 28 and 29 and will be supported on the carriage apron 5 by means of the screws 30, and will be formed with the apertured bearing ears 31 and 32 through which the offset ends of the trip rod 26 will extend. A small apertured bracket 33 will be supported on the apron 5 adjacent the pivoted pawl 22 to support the adjacent end of the trip rod 26 which is engageable with the pawl 22 when the automatic lathe stop is operated.

A cover plate 34 will be removably held in position over the half nut mechanism by means of the bolts or screws 35, as clearly shown in the drawings.

From the foregoing description, it will be apparent that the lathe may be operated with the automatic lathe stop mechanism when the hub member and the ratchet member are coupled together by the unlocking bolt 17, and the handle formed on the hub member is pressed downwardly until the pawl 22 engages the notch 14. In this position, the half nut mechanism will be set for instant release when the trip rod is engaged by the stop. An arcuate slot 36 will be formed through the cover plate 34 to permit the unlocking bolt 17 to extend therethrough.

As before mentioned, when the hub member and ratchet member is disconnected by removing the unlocking bolt 17, the half nut mechanism may be operated manually in the conventional manner.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. In combination with a lathe including a bed, a rack and a carriage supported on said bed, an automatic stop for said carriage, a lead screw and half-nut mechanism supported on said bed and said carriage respectively, an operating shaft for said half-nut mechanism, an adjustable stop on said rack, a rotatable two-notch ratchet member fixed to said operating shaft and having a handle secured thereto, resilient means for tensioning said ratchet member, a pivoted pawl adapted to engage the notches in said ratchet member, resilient means for tensioning said pawl, spaced bracket members, and a trip means slidably disposed in said bracket members and interposed between said stop and said pawl for releasing said half-nut mechanism when said trip means engages said stop.

2. In combination with a lathe including a bed, a rack and a carriage supported on said bed, an automatic stop for said carriage, a lead screw and half-nut mechanism supported on said bed and said carriage respectively, an operating shaft for said half-nut mechanism, an adjustable stop on said rack, a rotatable two-notch ratchet member fixed to said operating shaft and having a handle secured thereto, a release bolt rotatably mounted upon said ratchet member, means for coupling said bolt to said ratchet member, a pivoted pawl engaged with said ratchet member and adapted to engage the notches therein, resilient means for tensioning said pawl, spaced bearing brackets interposed between said stop and said pawl, and a slidable trip rod mounted in said bearing brackets and adapted to operate said pawl when engaged by said stop to release said half-nut mechanism.

3. In a lathe including a carriage and an apron therefor, a stop, a trip rod, a lead screw and a half-nut mechanism, an operating shaft for said half-nut mechanism, a hub member and integral handle retained on said operating shaft, a notched ratchet member mounted on said hub, means securing said ratchet member and said handle for movement in unison, a pawl mounted on said carriage between said ratchet member and said trip rod for releasing said half-nut mechanism when the trip rod engages said stop, said pawl being L-shaped, one leg thereof seated in said ratchet member and the other leg thereof engageable by said trip rod, and tension means secured to said apron urging said pawl into engagement with said ratchet member.

HARVEY B. WALDRON.

REFERENCES CITED

The following references are of record in the file of this patent:

UNITED STATES PATENTS

| Number | Name | Date |
|---|---|---|
| 2,101,754 | Randall | Dec. 7, 1937 |
| 2,345,613 | Lukis | Apr. 4, 1944 |